US012535949B2

(12) United States Patent
Wang et al.

(10) Patent No.: US 12,535,949 B2
(45) Date of Patent: Jan. 27, 2026

(54) METHOD AND APPARATUS FOR PROCESSING ACCESS REQUEST, STORAGE APPARATUS, AND STORAGE MEDIUM

(71) Applicant: Huawei Technologies Co., Ltd., Shenzhen (CN)

(72) Inventors: Shuai Wang, Shenzhen (CN); Yi Jiang, Chengdu (CN)

(73) Assignee: HUAWEI TECHNOLOGIES CO. LTD., Shenzhen (CN)

( * ) Notice: Subject to any disclaimer, the term of this patent is extended or adjusted under 35 U.S.C. 154(b) by 0 days.

(21) Appl. No.: 18/417,509

(22) Filed: Jan. 19, 2024

(65) Prior Publication Data

US 2024/0241639 A1 Jul. 18, 2024

Related U.S. Application Data

(63) Continuation of application No. PCT/CN2022/091606, filed on May 9, 2022.

(30) Foreign Application Priority Data

Jul. 22, 2021 (CN) .......................... 202110831258.6

(51) Int. Cl.
*G06F 12/00* (2006.01)
*G06F 3/06* (2006.01)

(52) U.S. Cl.
CPC .......... *G06F 3/0604* (2013.01); *G06F 3/0659* (2013.01); *G06F 3/0679* (2013.01)

(58) Field of Classification Search
CPC .... G06F 3/0604; G06F 3/0659; G06F 3/0679; G06F 3/061; G06F 3/0661; G06F 13/4027; G06F 3/067
See application file for complete search history.

(56) References Cited

U.S. PATENT DOCUMENTS

| 7,552,280 | B1* | 6/2009 | Naamad | G06F 3/0689 |
| | | | | 711/170 |
| 2007/0113025 | A1* | 5/2007 | Ozaki | G06F 11/2069 |
| | | | | 711/165 |
| 2007/0266218 | A1* | 11/2007 | Achiwa | G06F 3/0608 |
| | | | | 711/170 |
| 2008/0104340 | A1* | 5/2008 | Shih | G06F 13/161 |
| | | | | 711/154 |

(Continued)

FOREIGN PATENT DOCUMENTS

| CN | 108874324 | A | * | 11/2018 | ............ | G06F 3/064 |
| CN | 111030936 | A | * | 4/2020 | ............ | H04L 47/29 |
| CN | 112291259 | A | | 1/2021 | | |

*Primary Examiner* — Shawn X Gu
*Assistant Examiner* — Mohammad S Hasan
(74) *Attorney, Agent, or Firm* — Conley Rose, P.C.

(57) ABSTRACT

An access request in a remote direct memory access (RDMA) format is first obtained from the internal memory of the storage apparatus, where the access request is used for requesting to access the persistent storage medium in the storage apparatus. Then, the access request in the RDMA format is directly converted into an access request in a Non-Volatile Memory Express (NVMe) format, and a target operation corresponding to the access request in the NVMe format is executed to access the persistent storage medium.

20 Claims, 12 Drawing Sheets

(56) References Cited

U.S. PATENT DOCUMENTS

| | | | |
|---|---|---|---|
| 2011/0078395 A1* | 3/2011 | Okada | G06F 3/061 |
| | | | 711/170 |
| 2012/0093113 A1* | 4/2012 | Zhu | H04W 76/10 |
| | | | 370/329 |
| 2015/0220438 A1* | 8/2015 | Chakalian | G06F 11/3006 |
| | | | 711/146 |
| 2018/0067685 A1* | 3/2018 | Deng | G06F 3/067 |
| 2019/0129646 A1* | 5/2019 | Kang | G06F 3/0676 |
| 2019/0146682 A1* | 5/2019 | Subramanian | G06F 3/0659 |
| | | | 711/103 |
| 2019/0205214 A1* | 7/2019 | Morning-Smith | G06F 11/1438 |
| 2020/0019433 A1 | 1/2020 | Qiu et al. | |
| 2020/0065269 A1* | 2/2020 | Balasubramani | G06F 13/1668 |
| 2020/0225874 A1* | 7/2020 | Nimmagadda | G06F 3/0661 |
| 2020/0293465 A1* | 9/2020 | Yang | H04L 49/35 |
| 2021/0271413 A1* | 9/2021 | Herzogenrath | G06F 3/0679 |
| 2022/0103629 A1* | 3/2022 | Cherian | G06F 3/067 |
| 2022/0269543 A1* | 8/2022 | Samuel | G06F 9/5016 |
| 2024/0056889 A1* | 2/2024 | Xu | H04W 28/0268 |

\* cited by examiner

TO FIG. 10B

METHOD AND APPARATUS FOR PROCESSING ACCESS REQUEST, STORAGE APPARATUS, AND STORAGE MEDIUM

CROSS-REFERENCE TO RELATED APPLICATIONS

This is a continuation of International Patent Application No. PCT/CN2022/091606 filed on May 9, 2022, which claims priority to Chinese Patent Application No. 202110831258.6 filed on Jul. 22, 2021. The disclosures of the aforementioned applications are hereby incorporated by reference in their entireties.

TECHNICAL FIELD

This disclosure relates to the field of storage technologies, and in particular, to a method and an apparatus for processing an access request, a storage apparatus, and a storage medium.

BACKGROUND

A Non-volatile Memory Express over Fabric (NOF) storage network defines a general-purpose storage network protocol that supports a plurality of storage architectures. The storage network protocol enables scaling of local Non-Volatile Memory Express (NVMe) devices of a host in an NOF system, and allows data in an NVMe device in an NVMe subsystem to be accessed from a longer distance. An NOF system may include an NOF initiator (INI) and an NOF target. One or more storage disks are integrated on the NOF target. In a process of establishing a connection between the NOF initiator and the NOF target, the NOF target may map a storage disk on the NOF target to the NOF initiator. In this way, the NOF initiator can access the storage disk on the remote NOF target like accessing a local disk.

At present, there is usually a large access delay in a process of accessing the storage disk on the NOF target by the NOF initiator, resulting in low input/output operations per second (IOPS) of a storage apparatus in the NOF storage network.

SUMMARY

This disclosure provides a method for processing an access request, to reduce a delay in accessing a memory (for example, a storage disk) on an NOF target by an NOF initiator, and improve an IOPS capability of a storage apparatus in an NOF storage network. In addition, this disclosure further provides an apparatus for processing an access request, a computer-readable storage medium, and a computer program product.

According to a first aspect, this disclosure provides a method for processing an access request. The method is applied to a storage apparatus including an internal memory and a persistent storage medium. For example, the method may be executed by a processor in the storage apparatus. In a specific implementation, an access request in a remote direct memory access (RDMA) format is first obtained from the internal memory of the storage apparatus, where the access request is used for requesting to access the persistent storage medium in the storage apparatus. Then, the access request in the RDMA format is directly converted into an access request in an NVMe format, and a target operation corresponding to the access request in the NVMe format is executed to access the persistent storage medium.

In this way, when transmitted in the storage apparatus, the access request in the RDMA format does not need to be subjected to complex processing performed by a block device layer. This can shorten a transmission path of the access request and reduce a transmission delay, thereby reducing a delay in accessing the persistent storage medium in the storage apparatus by a host and improving an IOPS capability of the storage apparatus in an NOF storage network. In addition, the storage apparatus does not need to apply for and maintain a block input/output (BIO) resource for each access request, thereby reducing resource consumption of the storage apparatus.

In a possible implementation, that the access request in the RDMA format is directly converted into an access request in an NVMe format may include: first, obtaining the access request in the RDMA format from the internal memory, where the access request in the RDMA format may be, for example, read from a queue in a network interface card to the internal memory in advance by the processor in the storage apparatus; and then, converting the access request in the RDMA format read from the internal memory into the access request in the NVMe format, and writing the access request in the NVMe format into an NVMe submit queue. In this way, the access request may be directly transmitted to the NVMe submit queue, thereby shortening a transmission path of the access request and reducing a transmission delay.

In a possible implementation, that a target operation corresponding to the access request in the NVMe format is executed to access the persistent storage medium may include: obtaining the access request from the NVMe submit queue, executing the access request to read data from or write data into the persistent storage medium, and then storing a response message to the access request into an NVMe completion queue. For example, the response message may be a feedback message indicating that the data writing succeeds or fails, or may be data read from the persistent storage medium, or the like. In this way, the corresponding data writing or reading may be implemented based on the access request.

In a possible implementation, after the response message is stored into the NVMe completion queue, the response message in the NVMe completion queue may be further directly converted from the NVMe format into the RDMA format, and the response message is transmitted based on an RDMA protocol. For example, the response message may be transmitted to the host that sends the access request. In this way, the host may obtain the response message corresponding to the access request.

In a possible implementation, a data volume of data that the access request in the RDMA format requests to access does not exceed a preset threshold, to avoid a case in which the data volume of the data that the received access request in the RDMA format requests to access is excessively large and the storage apparatus needs to split the access request into a plurality of data access requests.

According to a second aspect, based on a same concept as that of a method embodiment of the first aspect, embodiments of this disclosure provide an apparatus for processing an access request. The apparatus has a corresponding function of realizing each of the implementations of the first aspect. The function may be implemented by hardware, or may be implemented by hardware executing corresponding software. The hardware or the software includes one or more modules corresponding to the foregoing function.

According to a third aspect, embodiments of this disclosure provide a storage apparatus, including a processor and a memory. The memory is configured to store instructions. When the storage apparatus runs, the processor executes the instructions stored in the memory, to enable the storage apparatus to execute the method for processing an access request according to the first aspect or any one of the implementations of the first aspect. It needs to be noted that the memory may be integrated in the processor, or may be independent of the processor. The storage apparatus may further include a bus. The processor is connected to the memory through the bus. The memory may include a readable memory and a random-access memory (RAM).

According to a fourth aspect, this disclosure provides a computer-readable storage medium. The computer-readable storage medium stores instructions. When the instructions are run on a computer device, the computer device is enabled to execute the method according to the first aspect or any one of the implementations of the first aspect.

According to a fifth aspect, this disclosure provides a computer program product including instructions. When the computer program product is run on a computer device, the computer device is enabled to execute the method according to the first aspect or any one of the implementations of the first aspect.

In this disclosure, the implementations according to the foregoing aspects may be further combined to provide more implementations.

BRIEF DESCRIPTION OF DRAWINGS

To describe technical solutions in embodiments of this disclosure more clearly, the following briefly introduces the accompanying drawings required for describing the embodiments. The accompanying drawings in the following description merely show some embodiments described in this disclosure, and a person of ordinary skill in the art may still derive other drawings from these accompanying drawings.

DESCRIPTION OF EMBODIMENTS

In the specification, claims, and accompanying drawings of this disclosure, the terms "first", "second", and the like are intended to distinguish between similar objects but do not necessarily indicate a particular order or sequence. It may be understood that the terms used in this way are interchangeable in proper cases, and this is merely a distinguishing manner used when objects having a same attribute are described in embodiments of this disclosure.

This disclosure may be applied to an application scenario of a centralized storage system. The centralized storage system is a central node including one or more main devices. Data is centrally stored on the central node, and all data processing services of the entire system are centrally deployed on the central node. In other words, in the centralized storage system, a terminal or a client is only responsible for data input and output, and data storage and control processing are completely implemented by the central node. A most important feature of the centralized system is a simple deployment structure. There is no need to consider how to deploy a service on a plurality of nodes. Therefore, there is no need to consider distributed collaboration among a plurality of nodes.

Figure 1:
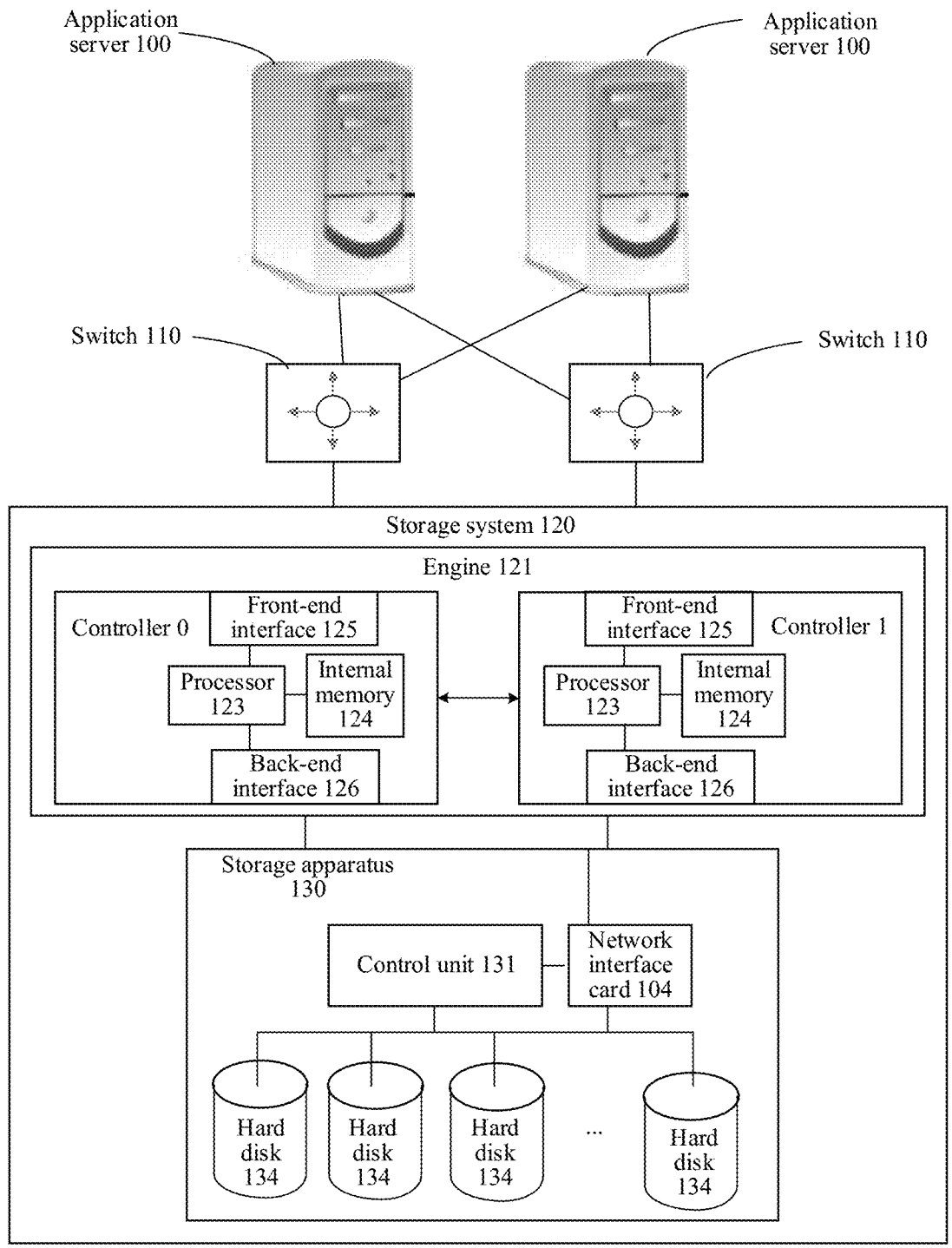
FIG. 1 is a schematic diagram of an architecture of a centralized storage system that uses a disk-controller separation architecture according to an embodiment of this disclosure.

Refer to FIG. 1, which is a schematic diagram of an architecture of an example centralized storage system that uses a disk-controller separation architecture. In the centralized storage system shown in FIG. 1, a user accesses data through application programs. A computer running these application programs is referred to as an "application server". The application server 100 may be a physical machine, or may be a virtual machine. A physical application server includes but is not limited to a desktop computer, a server, a notebook computer, and a mobile device. The application server accesses the storage system through a fiber channel switch 110 to access data. However, the switch 110 is merely an optional device, and the application server 100 may also directly communicate with the storage system 120 through a network. Alternatively, the fiber channel switch 110 may be replaced with an Ethernet switch, an InfiniBand switch, a RDMA over Converged Ethernet (RoCE) switch, and the like.

The storage system 120 shown in FIG. 1 is a centralized storage system. The centralized storage system features a unified entry point, and all data from external devices needs to pass through this entry point. This entry point is an engine 121 of the centralized storage system. The engine 121 is the most important core component of the centralized storage system, and is responsible for implementing many advanced functions of the storage system.

As shown in FIG. 1, the engine 121 includes one or more controllers. FIG. 1 shows an example where the engine includes two controllers. There is a mirror channel between a controller 0 and a controller 1. In this way, after writing a piece of data to an internal memory 124 of the controller 0, the controller 0 may send a copy of the data to the controller 1 through the mirror channel, and the controller 1 stores the copy in a local internal memory 124 of the controller 1. Therefore, the controller 0 and the controller 1 provide backup for each other. When the controller 0 is faulty, the controller 1 may take over services of the controller 0. When the controller 1 is faulty, the controller 0 may take over services of the controller 1. This prevents the entire storage system 120 from being unavailable due to a hardware fault. When four controllers are deployed in the engine 121, there is a mirror channel between any two of the controllers. Therefore, any two controllers provide backup for each other.

The engine 121 further includes a front-end interface 125 and a back-end interface 126. The front-end interface 125 is configured to communicate with the application server 100, to provide a storage service for the application server 100. The back-end interface 126 is configured to communicate with a hard disk 134, to expand a capacity of the storage system. The engine 121 may be connected to more hard disks 134 through the back-end interface 126, thereby forming a very large storage resource pool.

In terms of hardware, as shown in FIG. 1, the controller 0 includes at least a processor 123 and the internal memory 124. The processor 123 is a central processing unit (CPU), and is configured to process a data access request from outside the storage system (from a server or another storage system) and process a request generated inside the storage system. For example, when receiving, through the front-end interface 125, data write requests sent by the application server 100, the processor 123 temporarily stores data in the data write requests into the internal memory 124. When a total volume of data in the internal memory 124 reaches a threshold, the processor 123 sends, through the back-end interface, the data stored in the internal memory 124 to the hard disk 134 for persistent storage.

The internal memory 124 is an internal storage that directly exchanges data with the processor, allows data reading and writing at any time at a high speed, and serves as a temporary data storage for an operating system or other running programs. The internal memory includes at least two types of memories. For example, the internal memory may be a RAM or a read-only memory (ROM). For example, the RAM is a dynamic random-access memory (DRAM) or a storage class memory (SCM). The DRAM is a semiconductor memory, and is a volatile memory device like most RAMs. The SCM is a hybrid storage technology that combines characteristics of both a storage apparatus and a memory. The storage class memory can provide a higher read/write speed than a hard disk, has an access speed lower than that of the DRAM, and requires lower costs than the DRAM. However, the DRAM and the SCM are merely examples in this embodiment. The internal memory may further include other RAMs, for example, a static random-access memory (SRAM). For example, the ROM may be a programmable read-only memory (PROM), an erasable programmable read-only memory (EPROM), or the like. In addition, the internal memory 124 may alternatively be a Dual In-Line Memory Module (DIMM), that is, a module formed by DRAMs, or may be a solid-state disk (SSD). In an actual application, a plurality of internal memories 124 and different types of internal memories 124 may be configured in the controller 0. A quantity and types of the internal memories 113 are not limited in this embodiment. In addition, the internal memory 124 may be configured to have a power failure protection function. The power failure protection function means that data stored in the internal memory 124 is not lost even a system is powered on again after a power failure. An internal memory with the power failure protection function is referred to as a non-volatile memory.

The internal memory 124 stores a software program, and a processor 123 may manage the hard disks by running the software program in the internal memory 124. For example, the hard disks may be abstracted into a storage resource pool, then divided into logical unit numbers (LUNs), and provided to a server for use. The LUNs are actually hard disks shown on the server. Certainly, some centralized storage systems are file servers and may provide a file sharing service for a server.

A hardware composition and a software structure of the controller 1 (and other controllers that are not shown in FIG. 1) are similar to those of the controller 0, and details are not described herein again.

FIG. 1 shows a centralized storage system with disk-controller separation. In the system, the engine 121 may not have a hard disk slot, the hard disk 134 needs to be placed in a storage apparatus 130, and the back-end interface 126 communicates with the storage apparatus 130. The back-end interface 126 exists in the engine 121 in a form of an adapter card, and two or more back-end interfaces 126 may be used on one engine 121 to connect to a plurality of disk enclosures. Alternatively, the adapter card may be integrated on a main board. In this case, the adapter card may communicate with a processor 112 through a Peripheral Component Interconnect Express (PCIE) bus.

It needs to be noted that FIG. 1 shows only one engine 121. However, in an actual application, the storage system may include two or more engines 121, and redundancy or load balancing is implemented among the engines 121.

The storage apparatus 130 includes a control unit 131 and several hard disks 134. The control unit 131 may have a variety of forms. In one case, the storage apparatus 130 may be a smart disk enclosure. As shown in FIG. 1, the control unit 131 includes a CPU and an internal memory. The CPU is configured to execute operations such as address translation and data reading and writing. The internal memory is configured to temporarily store data to be written into the hard disk 134, or data that is read from the hard disk 134 and is to be sent to a controller. In another case, the control unit 131 is a programmable electronic component, for example, a data processing unit (DPU). The DPU has versatility and programmability of the CPU, but is also used for special purposes and may run efficiently to process network data packets, storage requests, or analysis requests. The DPU is distinguished from the CPU by a high degree of parallelism (needing to process a large quantity of requests). Optionally, the DPU herein may further be replaced with a graphics processing unit (GPU), embedded neural-network processing units (NPU), or other processing chips. Generally, a quantity of control units 131 may be one, or two or more. When the storage apparatus 130 includes at least two control units 131, an association relationship may exist between the hard disks 134 and the control units 131. If the association relationship exists between the hard disk 134 and the control unit 131, each control unit can access only a hard disk associated with the control unit. This usually involves forwarding data read/write requests between the control units 131, resulting in a long data access path. In addition, in a case of insufficient storage space, when a new hard disk 134 is added to the storage apparatus 130, a new association relationship needs to be established between the hard disks 134 and the control units 131, resulting in complex operations and poor scalability of the storage space. Therefore, in another implementation, a function of the control unit 131 may be offloaded to a network interface card 104. In other words, in this implementation, the storage apparatus 130 does not include the control unit 131, but instead, the network interface card 104 implements data reading and writing, address translation, and other calculation functions. In this case, the network interface card 104 is an intelligent network interface card. The network interface card 104 may contain a CPU and an internal memory. In some application scenarios, the network interface card 104 may also include a persistent storage medium, such as a persistent memory (PM), a non-volatile random-access memory (NVRAM), or a phase-change memory (PCM). The CPU is configured to execute operations such as address translation and data reading and writing. The internal memory is configured to temporarily store data to be written into the hard disk 134, or data that is read from the hard disk 134 and is to be sent to a controller. The network interface card 104 may alternatively be a programmable electronic component, for example, a DPU. The DPU has versatility and programmability of the CPU, but is also used for special purposes and may run efficiently to process network data packets, storage requests, or analysis requests. The DPU is distinguished from the CPU by a high degree of parallelism (needing to process a large quantity of requests). Optionally, the DPU herein may further be replaced with a GPU, embedded NPU, or other processing chips. There is no association relationship between the network interface card 104 and the hard disks 134 in the storage apparatus 130, and the network interface card 104 may access any one of the hard disks 134 in the storage apparatus 130, thereby facilitating scaling of hard disks in the case of insufficient storage space.

Based on a type of a communication protocol between the engine 121 and the storage apparatus 130, the storage apparatus 130 may be a Serial Attached Small Computer System Interface (SAS) disk enclosure, an NVMe disk enclosure, an Internet Protocol (IP) disk enclosure, or other types of disk enclosures. The SAS disk enclosure uses a SAS 3.0 protocol, and each enclosure supports 25 SAS hard disks. The engine 121 is connected to the storage apparatus 130 through an onboard SAS interface or SAS interface module. The NVMe disk enclosure is more like a complete computer system. An NVMe disk is inserted into the NVMe disk enclosure. The NVMe disk enclosure is connected to the engine 121 through an RDMA interface.

Figure 2:
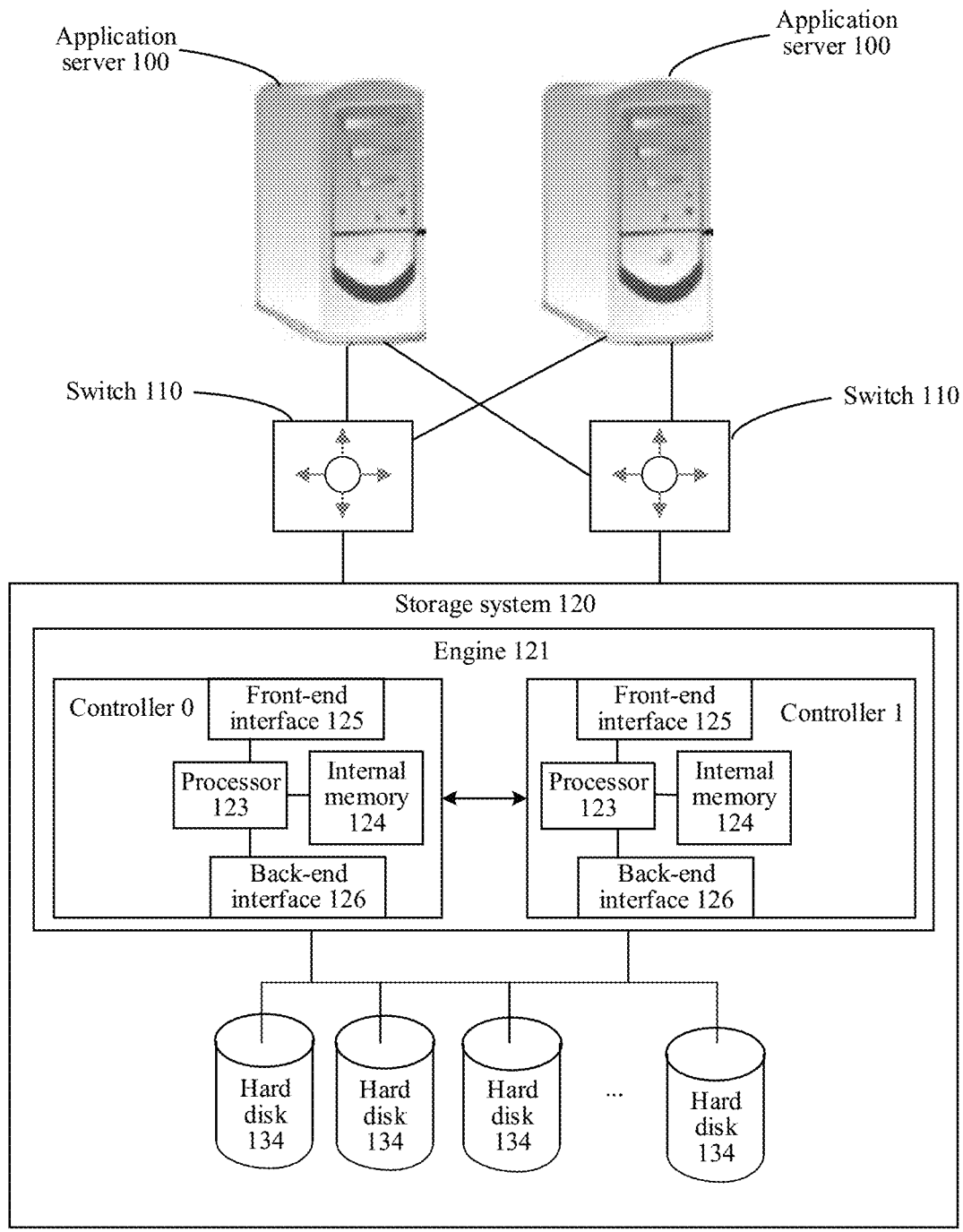
FIG. 2 is a schematic diagram of an architecture of a centralized storage system that uses a disk-controller integration architecture according to an embodiment of this disclosure.

Certainly, the centralized storage system that uses the disk-controller separation architecture shown in FIG. 1 is described by way of example only. In an actual application, the centralized storage system may alternatively use a disk-controller integration architecture, as shown in FIG. 2. Different from the disk-controller separation architecture shown in FIG. 1, in the disk-controller integration architecture shown in FIG. 2, the storage system 120 may be deployed in a storage apparatus. To be specific, the engine 121 may have a hard disk slot, the hard disk 134 is placed in the hard disk slot, and the controller 0 (and the controller 1) in the storage system 120 and the hard disk 134 may be located in the same storage apparatus.

Figure 3:
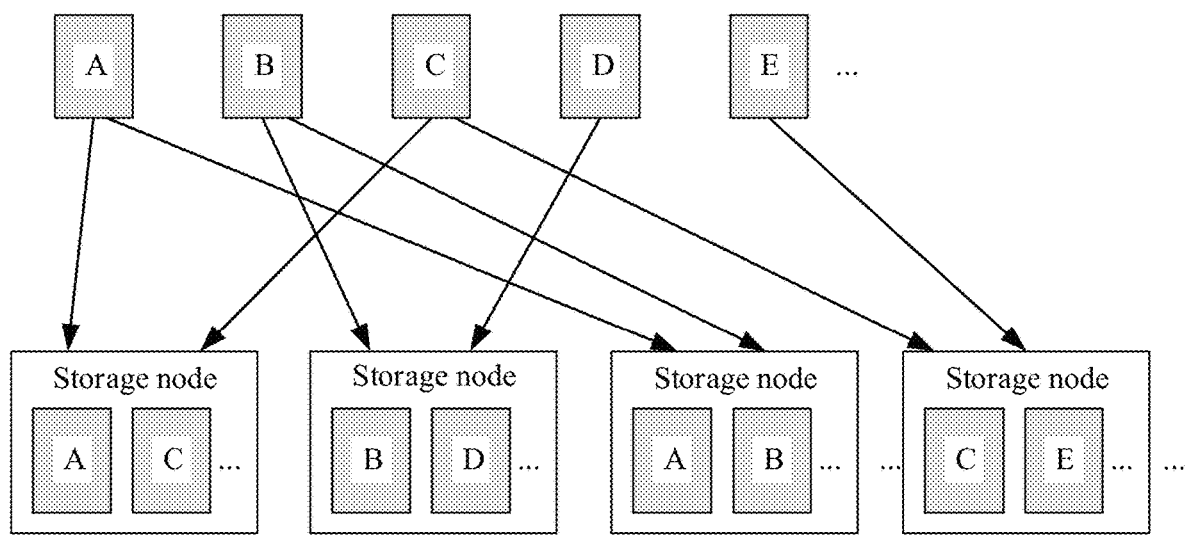
FIG. 3 is a schematic diagram of an example distributed storage system according to an embodiment of this disclosure.

In an actual application, this disclosure may also be applied to a distributed storage system shown in FIG. 3. The distributed storage system is a system in which data is stored in a distributed manner on a plurality of independent storage nodes, as shown in FIG. 3. A network storage system may use a centralized storage array to store all data. Performance of the storage array is not only a bottleneck of system performance, but also a focus of reliability and security, and cannot meet requirements of large-scale storage applications. The distributed network storage system uses a scalable system structure and uses a plurality of storage nodes to share storage load. This improves reliability, availability, and access efficiency of the system, and is easy to scale.

Figure 4:
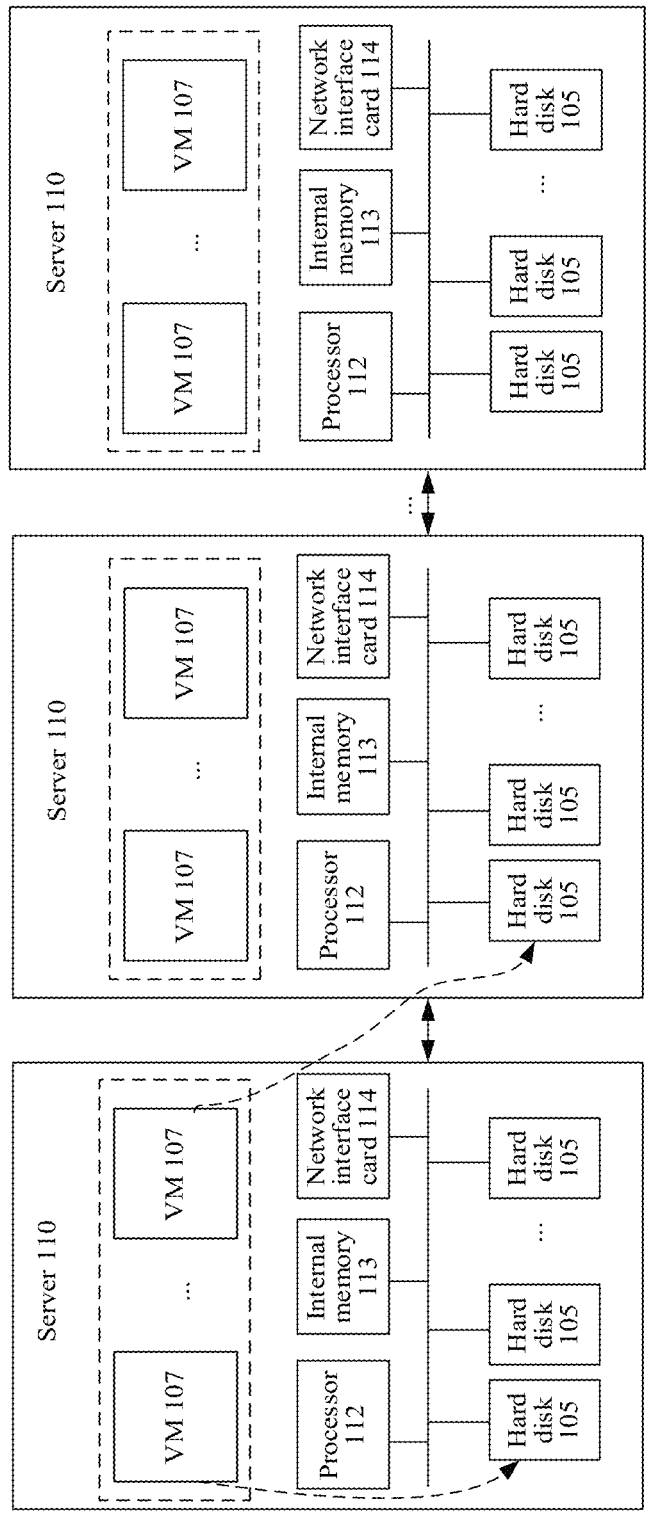
FIG. 4 is a schematic diagram of an architecture of a distributed storage system that uses a fully converged architecture according to an embodiment of this disclosure.

Refer to FIG. 4. The distributed storage system may use a fully converged architecture. As shown in FIG. 4, as shown in FIG. 4, the distributed storage system according to this embodiment includes a server cluster. The server cluster includes one or more application servers 110 (FIG. 4 shows three servers 110, but this disclosure is not limited to three servers 110), and the servers 110 may communicate with each other. The server 110 is a device having both a computing capability and a storage capability, such as a server or a desktop computer. In terms of software, each server 110 has an operating system. A virtual machine 107 may be created on the server 110. A computing resource required by the virtual machine 107 is from a local processor 112 and a local internal memory 113 of the server 110. A storage resource required by the virtual machine 107 may be from a local hard disk 105 of the server 110, or may be from a hard disk 105 in another server 110. In addition, various application programs may be run in the virtual machine 107, and a user may trigger a data read/write request through an application program in the virtual machine 107.

In terms of hardware, as shown in FIG. 4, the server 110 includes at least the processor 112, the internal memory 113, a network interface card 114, and the hard disk 105. The processor 112, the internal memory 113, the network interface card 114, and the hard disk 105 are connected through a bus. The processor 112 and the internal memory 113 are configured to provide computing resources. The processor 112 is a CPU, and is configured to process a data access request from outside the server 110 or a request generated inside the server 110. For example, when receiving data write requests sent by the user, the processor 112 temporarily stores data in the data write requests into the internal memory 113. When a total volume of data in the internal memory 113 reaches a threshold, the processor 112 sends the data stored in the internal memory 113 to the hard disk 105 for persistent storage. In addition, the processor 112 is further configured to perform data computing or processing, such as metadata management, deduplication, data compression, data verification, storage space virtualization, and address translation. FIG. 3 shows only one CPU 112. In an actual application, there are usually a plurality of CPUs 112, and each CPU 112 includes one or more CPU cores. A quantity of CPUs and a quantity of CPU cores are not limited in this embodiment.

The internal memory 113 is an internal storage that directly exchanges data with the processor, allows data reading and writing at any time at a high speed, and serves as a temporary data storage for an operating system or other running programs. The internal memory includes at least two types of memories. For example, the internal memory may be a RAM or a ROM. For example, the RAM is a DRAM or an SCM. The DRAM is a semiconductor memory, and is a volatile memory device like most RAMs. The SCM is a hybrid storage technology that combines characteristics of both a storage apparatus and a memory. The storage class memory can provide a higher read/write speed than a hard disk, has an access speed lower than that of the DRAM, and requires lower costs than the DRAM. However, the DRAM and the SCM are merely examples in this embodiment. The internal memory may further include other RAMs, for example, an SRAM. For example, the ROM may be a PROM, an EPROM, or the like. In addition, the internal memory 113 may alternatively be a DIMM, that is, a module formed by DRAMs, or may be an SSD. In an actual application, a plurality of internal memories 113 and different types of internal memories 113 may be configured in a computing node 110. A quantity and types of the internal memories 113 are not limited in this embodiment. In addition, the internal memory 113 may be configured to have a power failure protection function. The power failure protection function means that data stored in the internal memory 113 is not lost even a system is powered on again after a power failure. An internal memory with the power failure protection function is referred to as a non-volatile memory.

The hard disk 105 is configured to provide a storage resource, for example, to store data. The hard disk 105 may be a magnetic disk or another type of storage medium, such as an SSD or a shingled magnetic recording hard disk. The network interface card 114 is configured to communicate with another application server 110.

Figure 5:
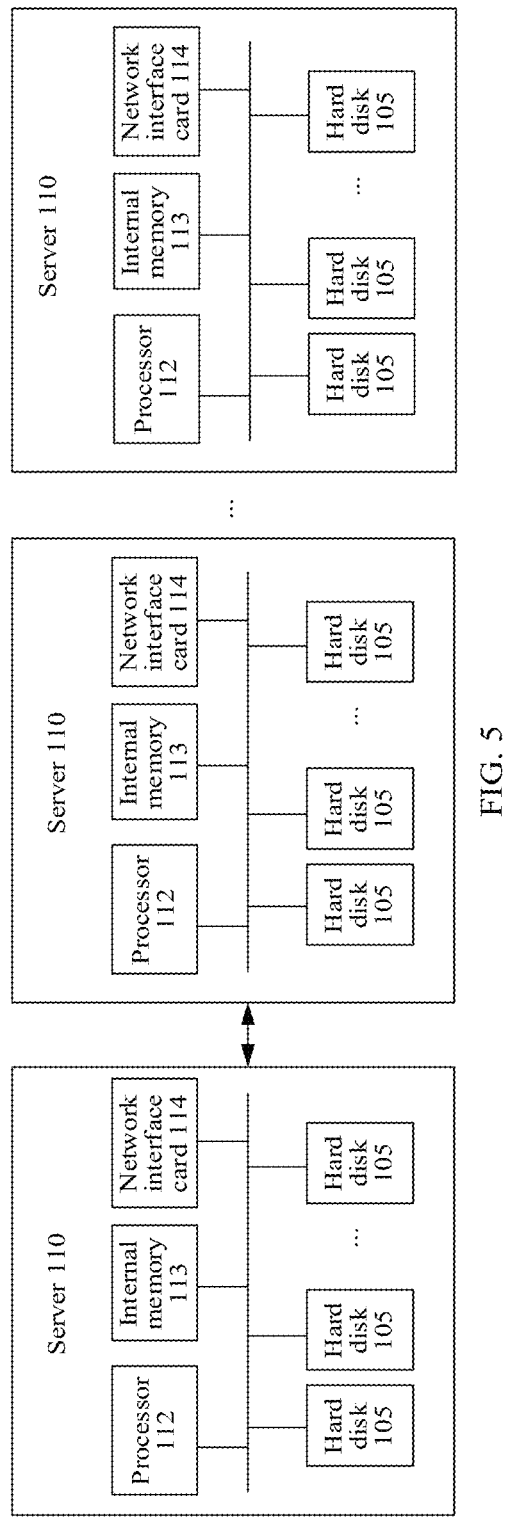
FIG. 5 is a schematic diagram of an architecture of a distributed storage system that uses a computing-in-memory architecture according to an embodiment of this disclosure.

Certainly, the distributed storage system that uses the fully converged architecture shown in FIG. 4 is described by way of example only. In an actual application, the distributed storage system may alternatively use a computing-in-memory architecture, as shown in FIG. 5. Different from the fully converged architecture shown in FIG. 4, in the computing-in-memory architecture shown in FIG. 5, no virtual machine may be created on the servers 110, and the processor 112 on each server 110 may receive an external data read/write request and perform corresponding data read/write processing.

Figure 6:
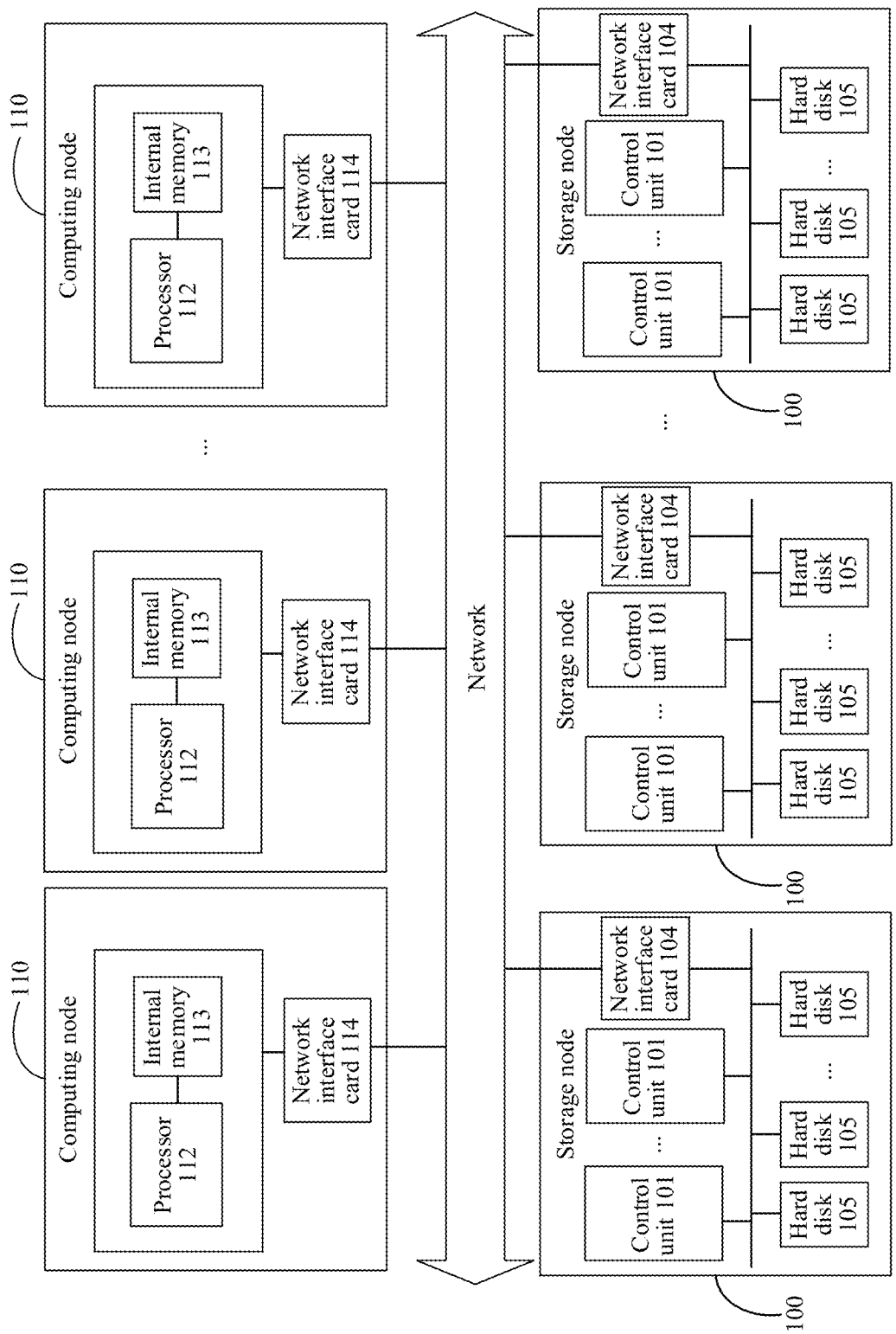
FIG. 6 is a schematic diagram of an architecture of a distributed storage system that uses a computing-memory separation architecture according to an embodiment of this disclosure.

Alternatively, the distributed storage system may use a computing-memory separation architecture, as shown in FIG. 6. Different from the computing-in-memory architecture shown in FIG. 6, a computing node (for example, the foregoing server 110) is separated from a storage node (for example, the foregoing storage apparatus), and the control unit 101 and the hard disk 105 may be located on a same storage node.

Figure 7:
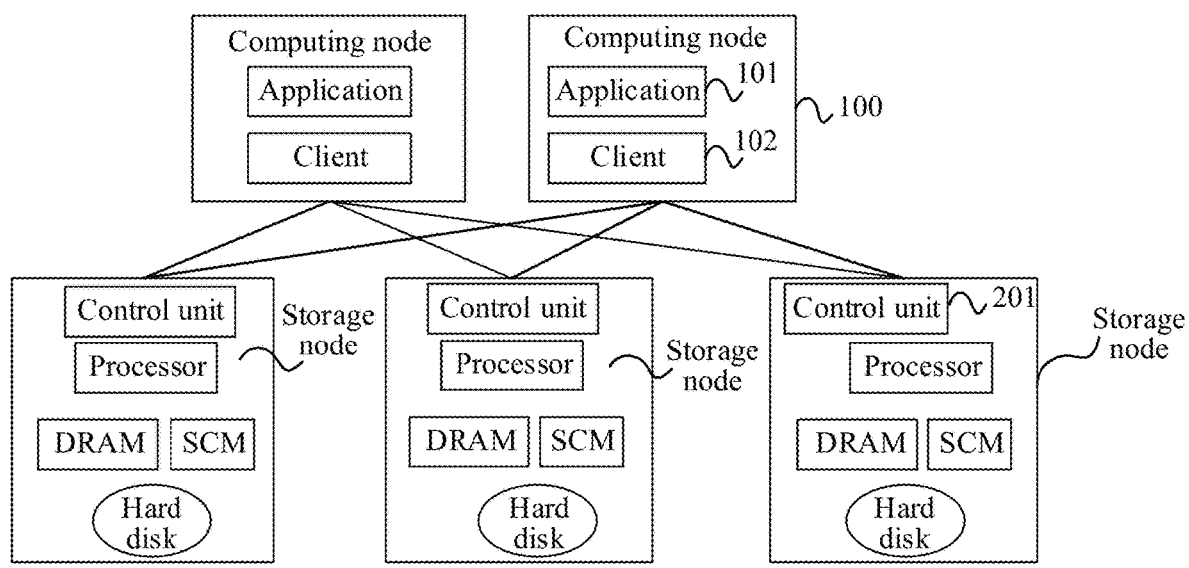
FIG. 7 is a schematic diagram of an architecture of a distributed storage system that uses a structured storage architecture according to an embodiment of this disclosure.

Alternatively, the distributed storage system may use a structured storage (e.g., memory fabric (MF)) architecture. Different from the distributed storage systems shown in FIG. 4 to FIG. 6, in the storage system shown in FIG. 7, each storage node includes different types of storage media. As shown in FIG. 7, the storage node includes storage media such as a DRAM, an SCM, and a hard disk. These different types of storage media all provide an internal memory interface and may be directly accessed by the processor. In addition, various types of internal memories included in these storage nodes constitute an internal memory pool. Data in the internal memory pool may be swapped in and out between different types of storage media based on access frequency.

Figure 8:
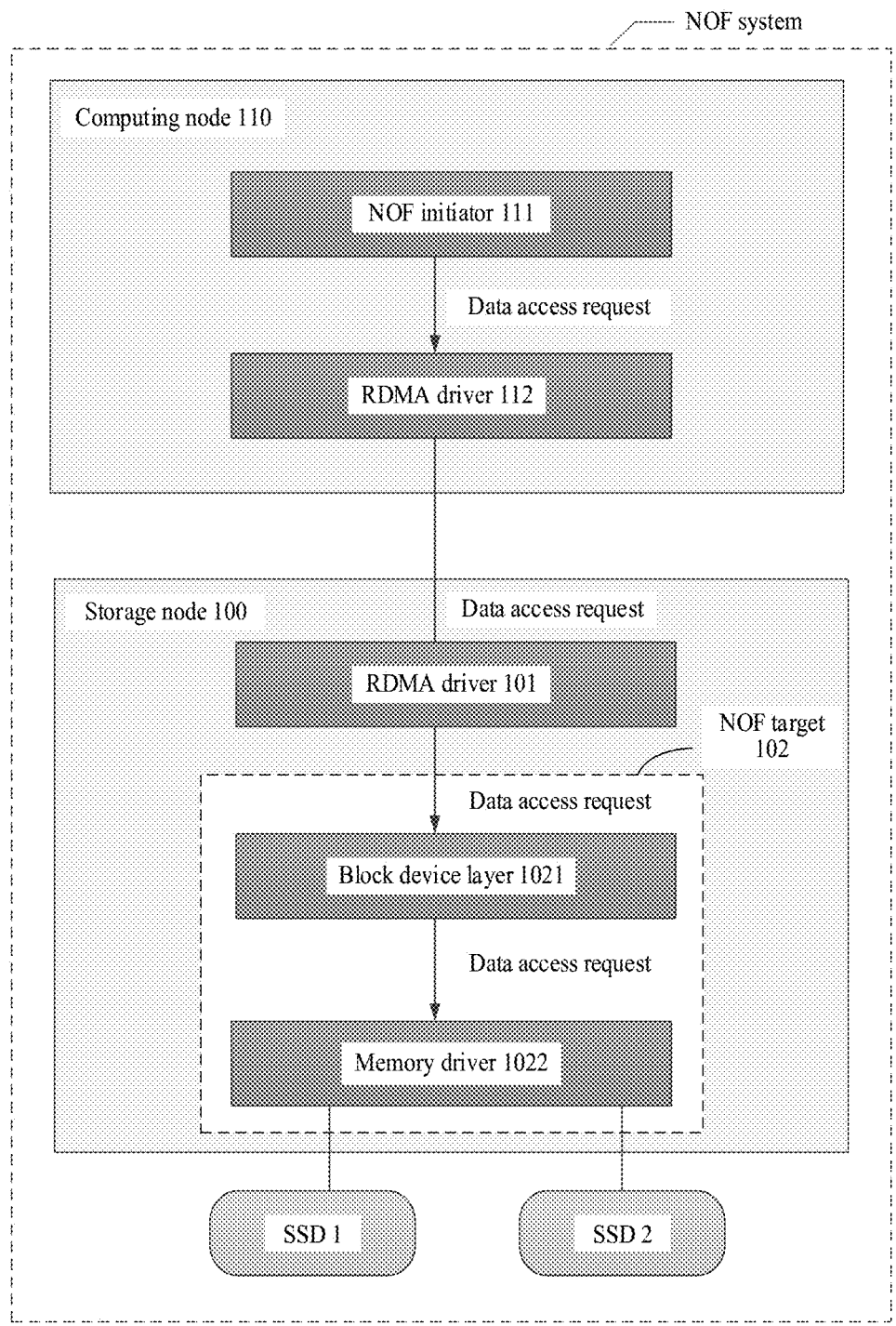
FIG. 8 is a schematic diagram of a scenario of accessing data in an NOF system.

The storage systems shown in FIG. 1 to FIG. 7 may be used in a scenario of accessing data in an NOF system shown in FIG. 8. Use of the storage system shown in FIG. 6 in the NOF system is used as an example. As shown in FIG. 8, the NOF system 100 may include an NOF initiator 111 and an NOF target 102. The NOF initiator 111 may be, for example, an application program running on a computing node 110 in FIG. 6, and the NOF target 102 may be, for example, an application program running on a storage node 100. The storage node 100 where the NOF target 102 is located may include one or more memories, for example, an SSD and other NVMe devices. In FIG. 1, an example where the storage node 100 includes an SSD 1 and an SSD 2 is used for description.

The NOF initiator 111 may provide a service for a user during running. When the NOF initiator 111 needs to access data stored in the SSD 1 or write data into the SSD 1, the NOF initiator 111 may generate an access request in a memory access (e.g., RDMA) format, for example, an input/output (IO) request, and send the access request to the storage node 100 based on an RDMA protocol through an RDMA driver 112 on the NOF initiator 111.

The storage node 100 may receive the access request in the RDMA format through the RDMA driver 101, read the access request in the RDMA format into content in the storage node 100, and then transmit the access request in the RDMA format from the internal memory to a memory driver 1022.

The RDMA driver may transmit data in storage space of the computing node 110 to storage space of the storage node 100 through a front-end network as a message in a form of an RDMA packet, or transmit data in the storage space of the storage node 100 to the storage space of the computing node 110 through the front-end network as a message in a form of an RDMA packet. The transmission and copying operations are mainly executed by network interface cards (for example, RDMA network interface cards (RNICs)) of the computing node 110 and the storage apparatus 100, and do not need to be executed by the processor. Therefore, performance of the computing node 110 and the storage apparatus 100 is not affected.

In a process of transmitting an access request, if an access request in the internal memory is sent to a block device layer 1021 on the storage node 100, the block device layer 1021 requests a large quantity of BIO resources for the access request. The BIO resources may be, for example, a plurality of software functions having different functions, forming a software function call stack. Then, the block device layer 1021 processes the access request by using the requested BIO resources. For example, the block device layer 1021 may first create a software queue by using a software function A, and add the received access request to the software queue, to implement processing sequence of the access request. Then, the block device layer 1021 splits the access request stored in the software queue into a plurality of access sub-requests by using a software function B, where a data volume of data that each of the access sub-requests obtained through splitting requests to access or write is less than a preset threshold, to limit a data volume of data that is read or written during each memory access. Then, for each access sub-request, the block device layer 1021 may convert a format of the access sub-request from the RDMA format into a unified general format by using a software function C, and further convert, by using a software function D, the format of the access sub-request in the general format into a format complying with a persistent storage medium 905, for example, into an NVMe format. The persistent storage medium 905 is a memory that the NOF initiator 1021 requests to access. In this way, after being processed by the software functions C and D, the access sub-request is compatible with any type of memory on the NOF target 102, for example, compatible with an NVMe device or a non-volatile memory (NVM) such as a hard disk drive (HDD). In an actual application, the block device layer 1021 may further control a quantity of access requests, bandwidth, and the like.

In the process of transmitting the access request from the internal memory to the memory driver 1022, BIO resources need to be requested, and a large quantity of processing procedures need to be performed on the access request by using the requested BIO resources. This leads to a long transmission delay of the access request, increases a delay in accessing data by the NOF initiator 111, and reduce an IOPS capability of the NOF target 102 in an NOF storage network. In addition, because the NOF target 102 needs to request and maintain a large quantity of BIO resources for each access request, resource consumption of the NOF target 102 is also increased.

Based on this, embodiments of this disclosure provide a method for processing an access request. The method may be applied to a storage apparatus (for example, the storage node 100 including the NOF target 102). In a process of transmitting an access request from the internal memory to the memory driver 1022, the storage apparatus may directly convert the access request from an RDMA format into an NVMe format, and execute a target operation corresponding to the access request in the NVMe format, to access the persistent storage medium on the storage node 100. In this way, the access requests do not need to be subjected to complex processing performed by the block device layer during transmission. This can shorten a transmission path of the access request and reduce a transmission delay, thereby reducing a delay in accessing the persistent storage medium in the storage apparatus by the NOF initiator 111 and improving the IOPS capability of the storage apparatus in the NOF storage network. In addition, the storage apparatus does not need to apply for and maintain a BIO resource for each access request, thereby reducing resource consumption of the storage apparatus.

For ease of understanding, the following further describes embodiments of this disclosure with reference to the accompanying drawings.

Figure 9:
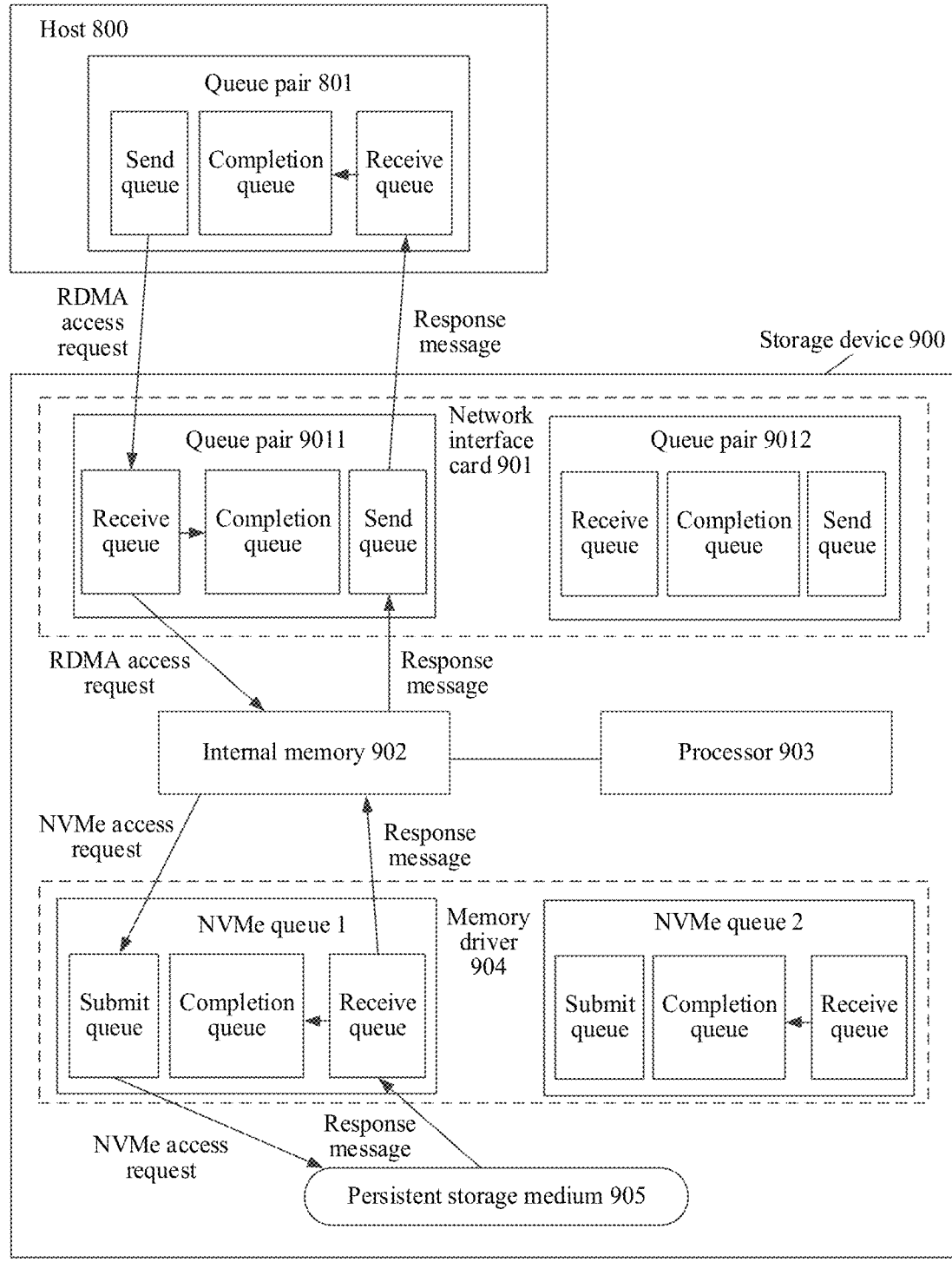
FIG. 9 is a schematic diagram of a structure of a storage apparatus according to an embodiment of this disclosure.

Refer to FIG. 9. FIG. 9 is a schematic diagram of a structure of a storage apparatus according to an embodiment of this disclosure. As shown in FIG. 9, the storage apparatus 900 includes a network interface card 901, an internal memory 902, a processor 903, a memory driver 904, and a persistent storage medium 904. The network interface card 901 may include at least one queue pair (QP). In FIG. 9, an example where a queue pair 801 and a queue pair 9012 are configured in the network interface card 901 is used for description. In addition, the memory driver 904 includes at least one queue group each including a submit queue, a receive queue, and a completion queue. In FIG. 9, an example where two queue groups (namely, an NVMe queue 1 and an NVMe queue 2) are configured in the memory driver 904 is used for description. In an actual application, the queues configured in the network interface card 901 and the memory driver 904 may be implemented through software queues or hardware queues. This is not limited in this embodiment.

The storage apparatus 900 may establish a communication connection to a host 800 (for example, a server or other devices) through the network interface card 901. In this way, the host 800 may send an access request to the storage apparatus 900, to request to access the persistent storage medium 905 in the storage apparatus 900, for example, access target data in the persistent storage medium 905 or write data into the persistent storage medium 905. In this embodiment, the storage apparatus 900 may perform data communication with the host 800 based on an RDMA protocol. In this way, after generating an access request for the target data, the host 800 may send the access request to the storage apparatus 900 through an RDMA driver on the host 800. Correspondingly, the network interface card 901 may receive the access request through the RDMA driver.

A data volume of data that the access request sent by the host 800 to the storage apparatus 900 requests to access in the storage apparatus 900 or requests to write into the storage apparatus 900 does not exceed the preset threshold. In an actual application scenario, when the data volume of the data that the host 800 requests to read or write exceeds the preset threshold, the host 800 may generate a plurality of access requests, which are respectively used for requesting to read or write different parts of the data. Access of data in the storage apparatus 900 is used as an example. It is assumed that the preset threshold is 4 kilobytes (KB) and a data volume of the data that the host 800 requests to access is 9 KB, the host 800 may separately generate three access requests for the 9 KB data, where a first access request used for requesting the first 4 KB data of the 9 KB data, a second access request used for requesting the second 4 KB data of the 9 KB data, and a third access request used for requesting the remaining 1 KB data of the 9 KB data. For ease of understanding, in this embodiment, an example where the storage apparatus 900 processes one access request sent by the host 800 is used for description. For a plurality of access requests sent by the host 800, the storage apparatus 900 may process the access requests one by one based on a similar processing manner.

In this embodiment, the network interface card 901 may add the access request to a receive queue (RQ) in a queue pair 9011 after receiving the access request, and when the access request is successfully written into the RQ, write information such as a location of the access request in the RQ into a completion queue (CQ) in the queue pair 9011. In this way, the processor 903 may read, from the completion queue in the queue pair 9011, location information of the access request stored in the receive queue, read, based on the location information, the access request stored in the receive queue in the queue pair 9011, and transmit the access request to the memory driver 904.

In a specific implementation, the processor 903 may fetch one access request from the receive queue in the queue pair 9011, and write the access request into the internal memory 902. Then, the processor 903 may parse the access request in the internal memory 902, to obtain an identifier of the persistent storage medium 905 carried in the access request, and further determine, based on the identifier of the persistent storage medium 905, a memory driver 904 for receiving the access request. The storage apparatus 900 may include one or more persistent storage media. When the storage apparatus 900 includes a plurality of persistent storage media, different persistent storage media may be accessed through different memory drivers. Alternatively, in another possible implementation, a correspondence between each persistent storage medium and an identifier range of an access request, for example, a correspondence between a persistent storage medium and a namespace, may be pre-configured in the storage apparatus 900. Identifier ranges of access requests corresponding to different persistent storage media do not overlap. In this way, the processor 903 may determine, based on the identifier of the received access request, an identifier range to which the identifier belongs, determine, based on the pre-configured correspondence, the persistent storage medium 905 corresponding to the identifier range, and determine a memory driver 904 required for accessing the persistent storage medium 905.

Because the storage apparatus 900 performs data exchange with the host 800 based on the RDMA protocol, and it may be difficult for the memory driver 904 to identify an access request in an RDMA format, the processor 903 may convert, before sending the access request to the memory driver 904, a format of the access request from the RDMA format into an NVMe format that can be identified by the memory driver 904, for the memory driver 904 to identify the access request. For example, the processor 903 may parse an initial access request in the RDMA format to obtain an identifier of target data that the host 800 requests to access, a data operation type (for example, a read operation), and other key data, and generate a new access request in the NVMe format based on data (where the data may be recorded in the storage apparatus 900 in advance) such as a logical address of the target data stored on the persistent storage medium 905. In an actual application, the generated new access request may be embodied as a cmd instruction. In addition, the processor 903 may further select a submit queue in an NVMe queue from a plurality of NVMe queues configured in the memory driver 904, to receive the access request in the NVMe format. For example, the processor 903 may select, based on a preset selection policy, the submit queue in the NVMe queue 2 to receive the access request. In this way, the processor 903 may write the access request in the NVMe format into the submit queue in the NVMe queue 2.

In this embodiment, because the processor 903 can directly convert the format of the access request in the RDMA format that is read to the internal memory 902, and send the converted access request to the memory driver 904, there is a low delay in transmitting the access request from the internal memory 902 to the memory drive 904, thereby reducing a delay in accessing the persistent storage medium 905 by the host 800.

The access request sent by the processor 903 to the memory driver 904 may be stored in a receive queue in the memory driver 904. Therefore, before sending the access request, the processor 903 may further determine an NVMe queue for receiving the access request in the memory driver 904. For example, a pass-through module 3023 may select, for example, a plurality of queues corresponding to the memory driver 904 in turn. For example, the memory driver 904 includes five NVMe queues, namely, an NVMe queue 1, an NVMe queue 2, an NVMe queue 3, an NVMe queue 4, and an NVMe queue 5. The processor 903 may write the first access request to a submit queue in the NVMe queue 1 when transmitting the first access request, write the second access request to a submit queue in the NVMe queue 2 when transmitting the second access request. The rest may be deduced by analogy. After writing the fifth access request to a submit queue in the NVMe queue 5, the processor 903 may write the sixth access request to the submit queue in the NVMe queue 1. The rest can be deduced by analogy.

Alternatively, the processor 903 may select, based on a hash (Hash) algorithm, an NVMe queue for receiving the access request. For example, the processor 903 determines the selected queue based on the following formula (1):

$$QP_n = ID_{access\text{-}request} \% QP_{max} \quad (1)$$

where $QP_n$ represents a sequence number of a selected NVMe queue (or a submit queue in this queue); $ID_{access\text{-}request}$ represents an identifier of an access request, and may be, for example, a serial number of the access request or the like; and $QP_{max}$ represents a quantity of NVMe queues (or a quantity of submit queues) included in the memory driver 904, and usually may be a maximum value of serial numbers of the NVMe queues.

Certainly, in an actual application scenario, the processor 903 may alternatively determine an NVMe queue for receiving the access request in other manners, for example, based on a random algorithm or a load balancing algorithm. This is not limited in this embodiment.

After receiving the access request in the NVMe format, the memory driver 904 may execute a target operation corresponding to the access request, for example, access the target data in the persistent storage medium 905 or write data into the persistent storage medium 905.

In a possible implementation, the memory driver 904 may concurrently execute a plurality of access requests, to improve efficiency of executing the access requests by the memory driver 904. Assuming that the memory driver 904 may concurrently execute 32 access requests, the processor 903 may continuously write the 32 access requests into one or more NVMe queues in the memory driver 904, so that the memory driver 904 concurrently executes the 32 access requests in the one or more NVMe queues. During the concurrent execution of the 32 access requests by the memory driver 904, if the processor 903 determines that there is a new access request needing to be transmitted to the memory drive 904, the processor 903 may attempt to send the new access request to the memory driver 904. If the sending succeeds, it indicates that the memory driver 904 has completed execution of some of the 32 access requests being currently executed, and can receive and execute the new access request sent by the processor 903. If the sending fails, it indicates that the memory driver 904 has not completed execution of the 32 access requests being currently executed, and cannot execute more access requests. In this case, the processor 903 may add the new access request to a pre-created waiting queue, and configure a state of the access request to a state of waiting due to a concurrency limit. When execution of one access request (or more than one access request) in the 32 access requests being executed by the memory driver 904 has been completed, the processor 903 may preferentially determine whether there is an access request in the waiting queue. If yes, the processor 903 may first fetch, from the waiting queue, the access request in the state of waiting due to the concurrency limit, and send the access request to the memory driver 904 for execution. If the waiting queue does not include an access request that has not been executed, the memory driver 904 may continue to fetch a new access request from a queue pair in the network interface card 901, and send the new access request to the memory driver 904 for execution.

The waiting queue may be implemented through a software queue or a hardware queue. This is not limited in this embodiment.

After executing the target operation corresponding to the access request, the memory driver 904 may write a response message obtained by executing the target operation into a receive queue in the NVMe queue 2. After successfully writing the response message into the receive queue, the memory driver 904 may write information such as a location of the response message in the receive queue to a completion queue in the NVMe queue 2. For example, the response message obtained by the memory driver 904 by executing the target operation may be, for example, data accessed from a memory, or may be a result of writing data into a memory (for example, a write success or a write failure).

Then, the processor 903 may read location information stored in the completion queue of the NVMe queue 2, and further read, based on the location information, the response message from the receive queue in the NVMe queue 2. In addition, the processor 903 may determine, by searching a record of a queue pair that stores the access request in advance, that the access request is stored in the queue pair 9011 in advance. Therefore, when transmitting the response message in the receive queue to the network interface card 901, the processor 903 may write the response message into a send queue in the queue pair 9011. For example, the response message generated by the memory driver 904 may be in the NVMe format. Therefore, when transmitting the response message to the network interface card 901, the processor 903 may convert the response message in the NVMe format into a response message in the RDMA format.

In this way, the network interface card 901 may send the response message stored in the send queue to the host 800, so that the host 800 obtains the response message. For example, the network interface card 901 may send the response message to the host 800 based on the RDMA protocol.

In an actual application, when the host 800 communicates with the storage apparatus 900, a queue pair 801 including a send queue, a receive queue, and a completion queue may be configured in the host 800, as shown in FIG. 9. The host 800 may write the generated access request into the send queue in the queue pair 801, so that a network interface card (not shown in FIG. 9) in the host 800 sends the access request in the send queue to the storage apparatus 900. Correspondingly, when the storage apparatus 900 feeds back the response message to the host 800, the storage apparatus 900 may write the response message into the receive queue in the queue pair 801.

In this embodiment, the processor 903 may establish a mapping relationship between a queue pair in the host 800 and a queue pair in the network interface card 901. In this way, when the host 800 and the storage apparatus 900 perform data exchange, an access request and a response message may be transmitted between the queue pairs having the established mapping relationship. In an actual application, a mapping relationship may be established between different queue pairs in the network interface card 901 and queue pairs in different hosts. For example, a mapping relationship may be established between the queue pair 9011 in the storage apparatus 900 and the queue pair 801 in the host 800, and a mapping relationship may be established between the queue pair 9012 and a queue pair in another host. Moreover, a mapping relationship may be established between a queue pair in the storage apparatus 900 and queue pairs in one or more hosts. This is not limited in this embodiment.

In addition, the processor 903 may further establish a mapping relationship between queue pairs in the network interface card 901 and the plurality of NVMe queues in the memory driver 904, so that an access request and a response message may be transmitted between the queues having the mapping relationship. As shown in FIG. 9, the processor 903 may write an access request stored in the queue pair 9011 into the submit queue in the NVMe queue 2. Correspondingly, the processor 903 may write a response message stored in the receive queue in the NVMe queue 2 into the queue pair 9011. Because the processor 903 may dynamically establish, for each access request, a mapping relationship between queue pairs in the network interface card 901 and the plurality of NVMe queues in the memory driver 904, queues configured by the storage apparatus 900 for the network interface card 901 may be decoupled from queues configured for the memory driver 904. In this way, even if a quantity of queue pairs in the network interface card 901 is increased or decreased (not decreased to 0), the plurality of NVMe queues in the memory driver 904 may not be affected. In addition, a change in a quantity of the plurality of NVMe queues in the memory driver 904 may not affect the queue pairs in the network interface card 901. In an actual application, a mapping relationship may be established between different queue pairs in the network interface card 901 and one or more queues in different memory drivers. Further, a mapping relationship may be established between the queue pair 9011 in the network interface card 901 and the NVMe queue 2 in the memory driver 904, a mapping relationship may be established between the queue pair 9012 in the network interface card 901 and an NVMe queue in another memory driver, and the like. In addition, a mapping relationship may be established between one queue pair in the network interface card 901 and one or more NVMe queues in one or more memory drivers, and the like. This is not limited in this embodiment.

Figure 10A:
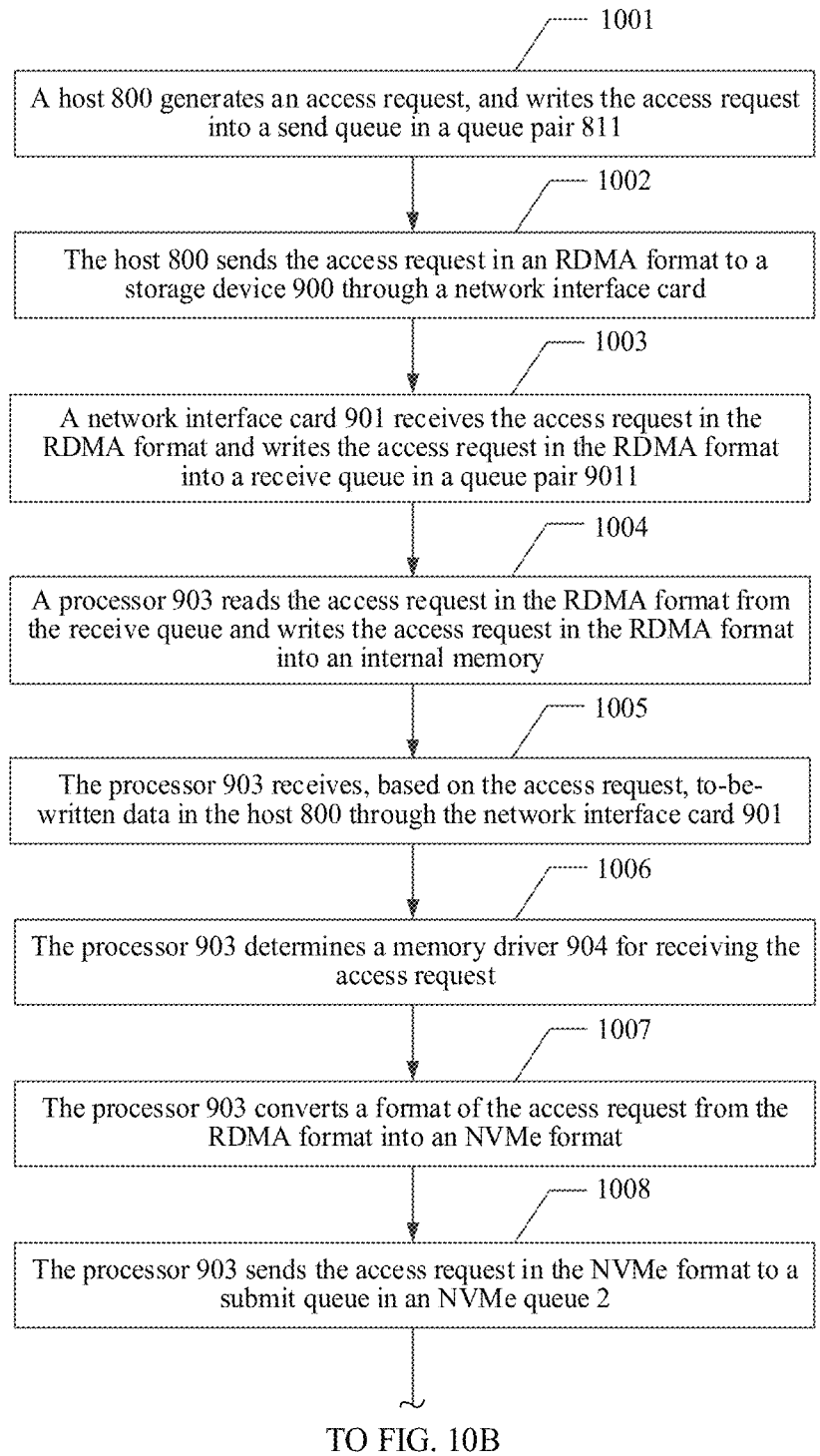
FIG. 10A and FIG. 10B are a schematic flowchart of a method for processing an access request according to an embodiment of this disclosure.
Figure 10B:
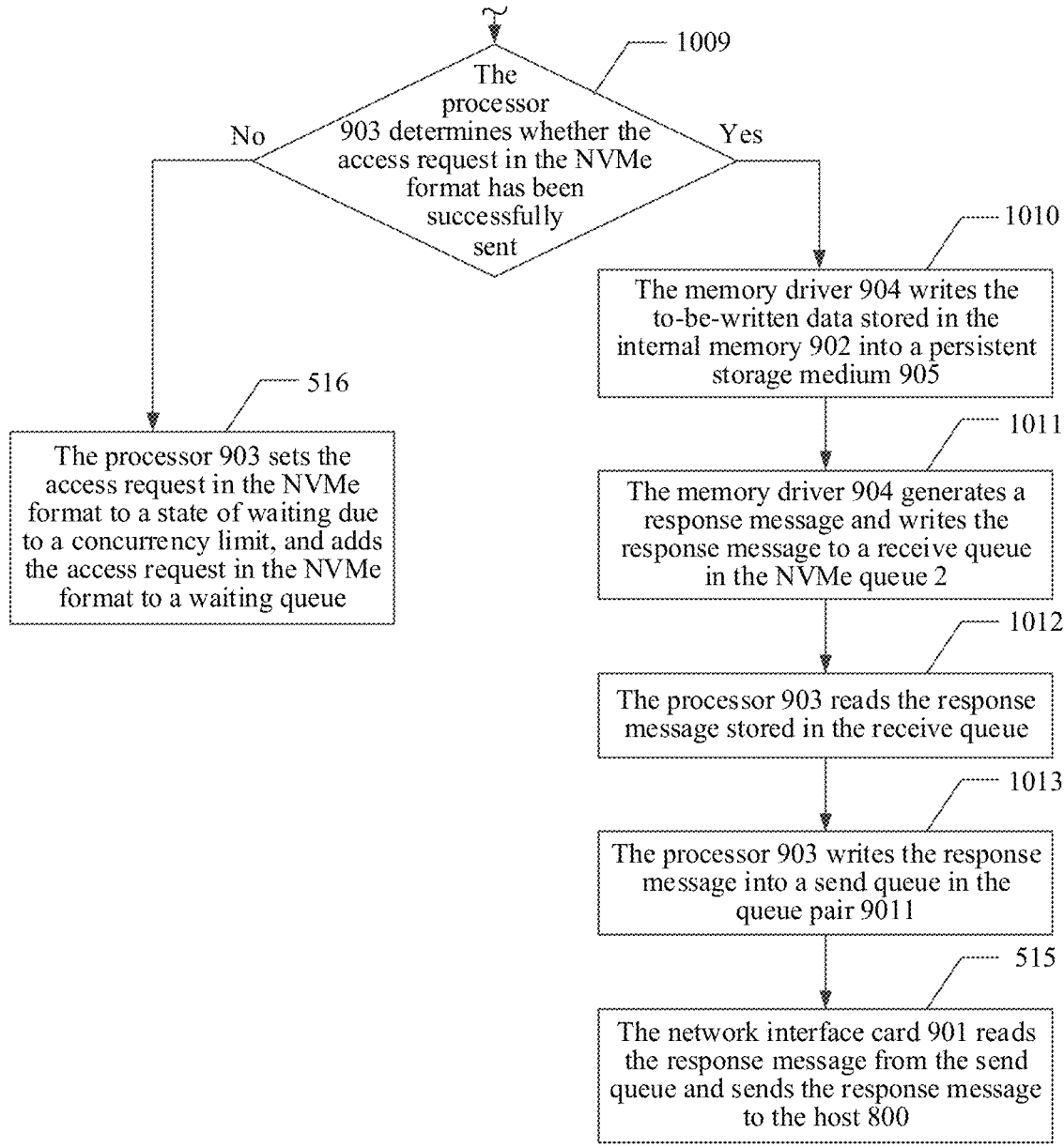

Refer to FIG. 10A and FIG. 10B. FIG. 10A and FIG. 10B are a schematic flowchart of a method for processing an access request according to an embodiment of this disclosure. The method for processing an access request shown in FIG. 10A and FIG. 10B may be applied to the storage apparatus shown in FIG. 9, or may be applied to another applicable storage apparatus. For ease of description, in this embodiment, an example where the method is applied to the storage apparatus shown in FIG. 9 is used for description. In addition, the access request may be used for accessing target data in the persistent storage medium 905, or may be used for writing data into the persistent storage medium 905. For ease of description and understanding, an example where the access request is used for writing data into the persistent storage medium 905 is used for description below.

Based on the storage apparatus 900 shown in FIG. 9, the method for processing an access request shown in FIG. 10A and FIG. 10B may include the following steps.

S1001: When needing to write data into the persistent storage medium 905 in the storage apparatus 900, an application program on a host 800 generates an access request in an RDMA format for the persistent storage medium 905, and writes the access request into a send queue in a queue pair 801.

For example, the application program on the host 800 may be a database running on the host or the like.

S1002: A network interface card in the host 800 reads the access request from the send queue in the queue pair 801, and sends the access request to the storage apparatus 900 based on an RDMA protocol.

In an actual application, the network interface card in the host 800 may send the access request in the RDMA format to the storage apparatus 900 through an RDMA driver.

S1003: The network interface card 901 in the storage apparatus 900 receives the access request, writes the access request into a receive queue in the queue pair 801, and when the access request is successfully written into the receive queue, writes location information of the access request in the receive queue into a completion queue in the queue pair 801.

Generally, when the storage apparatus 900 communicates with the host 800 based on the RDMA protocol, an access request received by the storage apparatus 900 is in the RDMA format.

S1004: The processor 903 reads the access request in the RDMA format from the receive queue in the queue pair 801 based on the location information stored in the completion queue, and writes the access request into the internal memory 902.

S1005: The processor 903 determines through parsing that an operation type corresponding to the access request is data writing, and indicates the network interface card 901 to migrate to-be-written data corresponding to the access request from an internal memory of the host 800 to the internal memory 902 of the storage apparatus 900.

In an implementation example, the processor 903 may parse the access request, and determine that a processing operation corresponding to the access request is a data write operation. In this case, the processor may generate a data transmission command (for example, an RDMA read operation), and transmit the data transmission command to the network interface card 901. The network interface card 901 executes the data transmission command to read the to-be-written data in the internal memory of the host to the internal memory 902 of the storage apparatus 900.

S1006: After receiving the to-be-written data, the processor 903 determines a memory driver 904 for receiving the access request.

In this embodiment, the processor 903 may determine, based on address information carried in the access request, the persistent storage medium 905 into which the to-be-written data needs to be written. For a specific implementation, refer to the relevant descriptions in the foregoing embodiments. Details are not described herein again.

S1007: The processor 903 directly converts a format of the access request from the RDMA format into an NVMe format that can be identified by the memory driver 904.

In the related art, the processor 903 needs to invoke a block device layer to process the access request in the RDMA format. The block device layer 1021 requests a large quantity of BIO resources for the access request, and converts the access request into the access request in the NVMe format after multiple times of format conversion. This increases a processing delay of the access request, and wastes processing resources of the processor. In the embodiment of this disclosure, the processor 903 invokes a pass-through module to directly convert the access request in the RDMA format into the access request in the NVMe format. This not only reduces a delay of the access request, but also saves resources of the processor.

For example, the processor 903 may parse the access request to obtain a data operation type (for example, a write operation) and other key data, and generate a new access request in the NVMe format based on data such as a logical address of the to-be-written data written into the persistent storage medium 905.

S1008: The processor 903 sends the access request in the NVMe format to the submit queue in the NVMe queue 2 in the memory driver 904.

In this case, the processor 903 may establish a mapping relationship between the queue pair 9011 in the network interface card 901 and the NVMe queue 2 (or the submit queue in the NVMe queue 2).

S1009: The processor 903 determines whether the access request in the NVMe format has been successfully sent. If yes, step S1010 is performed. If not, step S1015 is performed.

S1010: The memory driver 904 executes a data write operation corresponding to the access request in the NVMe format, and writes the to-be-written data stored in the internal memory 902 into the persistent storage medium 905.

S1011: After writing the data into the persistent storage medium 905, the memory driver 904 generates a corresponding response message, writes the response message into the receive queue in the NVMe queue 2, and after the writing succeeds, writes location information of the response message in the receive queue into the completion queue.

For example, the response message may indicate that the data has been successfully written into the persistent storage medium 905. In an actual application, when the data writing fails, the memory driver 904 may generate a response message indicating that the data writing fails.

S1012: The processor 903 reads, based on the location information stored in the completion queue in the NVMe queue 2, the response message stored in the receive queue in the NVMe queue 2.

S1013: The processor 903 writes the read response message into the send queue in the queue pair 9011.

The processor 903 may determine, based on the established mapping relationship, that a queue pair for receiving the response message is the queue pair 9011. In addition, a format of the response message generated by the memory driver 904 may be the NVMe format, and the processor 903 may first convert the response message in the NVMe format into a response message in an RDMA format, and then write the response message in the RDMA format into the send queue in the queue pair 9011.

S1014: The network interface card 901 reads the response message from the send queue in the queue pair 9011, and sends the response message to the host 800 based on the RDMA protocol.

S1015: The processor 903 sets the access request in the NVMe format to a state of waiting due to a concurrency limit, and adds the access request in the NVMe format to a waiting queue.

S1016: The processor 903 fetches the access request from the waiting queue, and continues to perform step S1008.

In an actual application, for the access request fetched from the waiting queue, the processor 903 may further determine whether the access request is set to the state of waiting due to the concurrency limit because previous sending of the access request to the memory driver 904 fails. If yes, step S1108 may be performed to implement processing of the access request. If not, it indicates that the access request is waiting to be executed due to other reasons. In this case, the storage apparatus 900 may perform other processing on the access request. For example, when the access request is set to the state of waiting due to the concurrency limit because execution of the access request is indicated to be interrupted, the storage apparatus 900 may delete or otherwise process the access request.

In addition, before sending the access request to the memory driver 904, the processor 903 may determine whether an access request in the state of waiting due to the concurrency limit exists in the pre-created waiting queue. If yes, the processor 903 preferentially reads the access request from the waiting queue and sends the access request to the memory driver 904. If not, the processor 903 may read an access request from the receive queue in the queue pair 9011 and send the access request to the memory driver 904.

In an actual application, when the host 800 continuously sends a plurality of access requests to the storage apparatus 900, the processor 903 may transmit one access request to the memory driver 904 and then continue to perform step S1103 to process a next access request.

In the foregoing embodiment, an example where the storage apparatus 900 processes an access request that is sent by the host 800 for requesting to write data is used for description. When the access request sent by the host 800 is used for requesting to access data in the persistent storage medium 905, a procedure of processing the access request by the storage apparatus 900 is similar to the foregoing procedure, and may be understood with reference to the foregoing procedure. A difference lies in that after receiving the access request, the storage apparatus 900 does not need to execute the foregoing interaction process for the to-be-written data with the host 800, and the processor 903 may directly convert the access request in the RDMA format in the internal memory 902 into the access request in the NVMe format and transmit the access request in the NVMe format to the submit queue in the NVMe queue 2. Correspondingly, the response message obtained by the memory driver 904 by executing the data read operation corresponding to the access request, may be data read from the persistent storage medium 905.

In this way, when transmitted in the storage apparatus 900, the access request does not need to be subjected to complex processing performed by a block device layer, and may be directly format-converted by the processor 903 and then sent to the storage driver 904. This can shorten a transmission path of the access request and reduce a transmission delay, thereby reducing a delay in accessing the persistent storage medium 905 in the storage apparatus 900 by the host, improving an IOPS capability of the storage apparatus 900, and reducing resource consumption of the storage apparatus 900.

The foregoing describes in detail the method for processing an access request according to this disclosure with reference to FIG. 1 to FIG. 10B. The following describes an apparatus for processing an access request and a computing device according to this disclosure with reference to FIG. 11 to FIG. 12.

Figure 11:
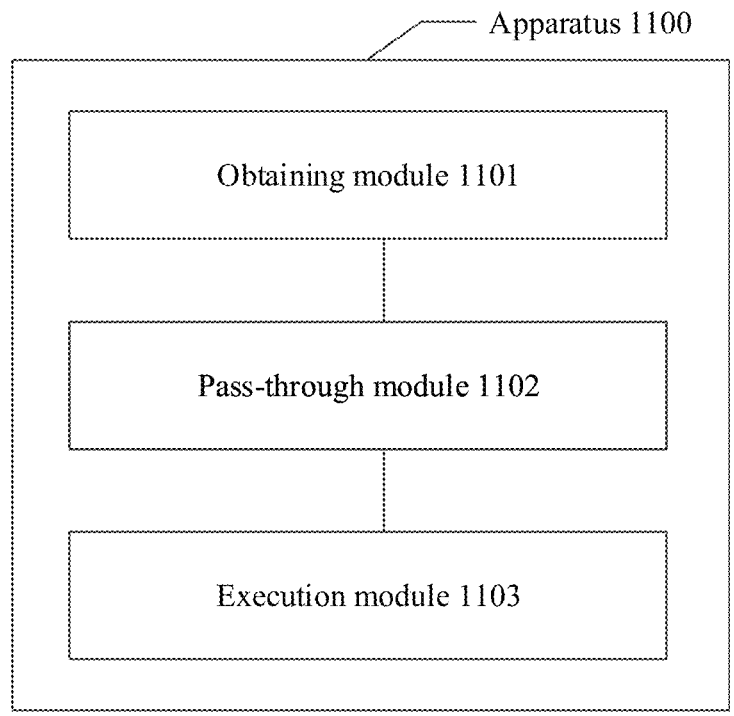
FIG. 11 is a schematic diagram of a structure of an apparatus for processing an access request according to an embodiment of this disclosure.

FIG. 11 is a schematic diagram of a structure of an apparatus for processing an access request according to this disclosure. The apparatus 1100 for processing an access request is used in a storage apparatus, for example, the storage apparatus 900 shown in FIG. 9. The storage apparatus includes an internal memory and a persistent storage medium. As shown in FIG. 11, the apparatus 1100 for processing an access request may include: an obtaining module 1101 configured to obtain an access request in a remote direct memory access RDMA format from the internal memory of the storage apparatus, where the access request is used for requesting to access the persistent storage medium; a pass-through module 1102 configured to directly convert the access request in the RDMA format into an access request in a non-volatile memory express NVMe format; and an execution module 1103 configured to execute a target operation corresponding to the access request in the NVMe format to access the persistent storage medium.

In a possible implementation, the pass-through module 1102 is configured to: obtain the access request in the RDMA format from the internal memory; convert the access request in the RDMA format into the access request in the NVMe format; and write the access request in the NVMe format into an NVMe submit queue.

In a possible implementation, the execution module 1103 is configured to: obtain the access request in the NVMe format from the NVMe submit queue; execute the access request in the NVMe format to read data from or write data into the persistent storage medium; and store a response message to the access request in the NVMe format into an NVMe completion queue.

In a possible implementation, the pass-through module 1102 is configured to: directly convert the response message in the NVMe completion queue from the NVMe format to the RDMA format, and transmit the response message based on an RDMA protocol.

In a possible implementation, a data volume of data that the access request in the RDMA format requests to access does not exceed a preset threshold.

The apparatus 1100 for processing an access request according to embodiments of this disclosure may correspondingly perform the method described in embodiments of this disclosure, and the foregoing and other operations and/or functions of the modules of the apparatus 1100 for processing an access request are respectively used for implementing corresponding procedures in the method in FIG. 10A and FIG. 10B. For brevity, details are not described herein again.

Figure 12:
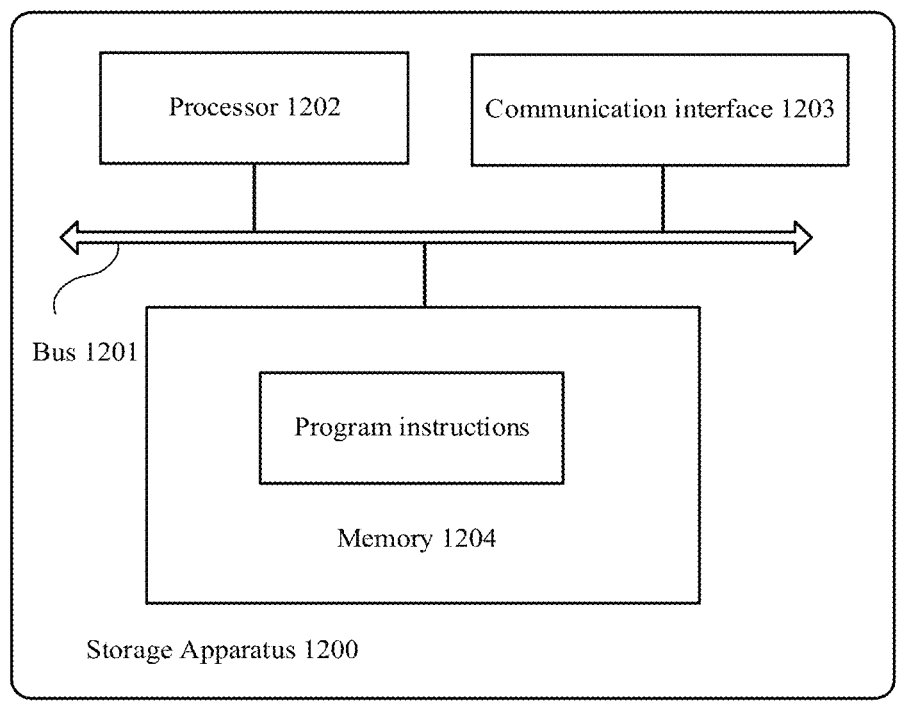
FIG. 12 is a schematic diagram of a structure of another storage apparatus according to an embodiment of this disclosure.

FIG. 12 is a schematic diagram of a storage apparatus 1200 according to this disclosure. As shown in the figure, the storage apparatus 1200 includes a processor 1201, a memory 1202, and a communication interface 1203. The processor 1201, the memory 1202, and the communication interface 1203 communicate with each other through a bus 1204, or may communicate with each other by other means such as wireless transmission. The memory 1202 is configured to store instructions, and the processor 1201 is configured to execute the instructions stored in the memory 1202. Further, the storage apparatus 1200 may further include an internal memory unit 1205, and the internal memory unit 1205 may be connected to the processor 1201, the storage medium 1202, and the communication interface 1203 through the bus 1204. The memory 1202 stores program code, and the processor 1201 may call the program code stored in the memory 1202 to execute the following operations: obtaining an access request in a remote direct memory access RDMA format from the internal memory of the storage apparatus, where the access request is used for requesting to access the persistent storage medium; directly converting the access request in the RDMA format into an access request in a non-volatile memory express NVMe format; and executing a target operation corresponding to the access request in the NVMe format to access the persistent storage medium.

It may be understood that, in embodiments of this disclosure, the processor 1201 may be a CPU, and the processor 1201 may also be another general-purpose processor, a digital signal processor (DSP), an application-specific integrated circuit (ASIC), a field-programmable gate array (FPGA) or other programmable logic device, a discrete gate or a transistor logic device, a discrete device component, or the like. The general-purpose processor may be a microprocessor or any other processor.

The memory 1202 may include a ROM and a RAM, and provide the instructions and data to the processor 1201. The memory 1202 may further include a nonvolatile RAM. For example, the memory 1202 may further store information about a device type.

The memory 1202 may be a volatile memory or an NVM, or may include a volatile memory and an NVM. The nonvolatile memory may be a ROM, a PROM, EPROM, an electrically erasable programmable read-only memory (EEPROM), or a flash memory. The volatile memory may be a RAM that is used as an external cache. By way of example, but not limitation, many forms of RAMs are available, such as a static random-access memory (SRAM), a DRAM, a synchronous dynamic random-access memory (SDRAM), an enhanced synchronous dynamic random-access memory, a synchlink dynamic random-access memory, and a direct Rambus random-access memory.

The communication interface 1203 is configured to communicate with another device (for example, the host 800) connected to the storage apparatus 1200. The bus 1204 not only includes a data bus, but also may further include a power bus, a control bus, a status signal bus, and the like. However, for clarity of description, various buses in the figure are denoted by the bus 1204.

It may be understood that the storage apparatus 1200 according to embodiments of this disclosure may correspond to the apparatus 1100 for processing an access request in embodiments of this disclosure and may correspond to a corresponding entity executing the method shown in FIG.

10A and FIG. 10B in embodiments of this disclosure. In addition, the foregoing and other operations and/or functions implemented by the storage apparatus 1200 are respectively used for implementing corresponding procedures in the method in FIG. 10A and FIG. 10B. For brevity, details are not described herein again.

In addition, an embodiment of this disclosure further provides a computer-readable storage medium. The computer-readable storage medium stores instructions. When the instructions are run on a computer device, the computer device is enabled to perform the method in the foregoing embodiments.

An embodiment of this disclosure further provides a computer program product. When the computer program product is executed by a plurality of computers, the plurality of computers is enabled to perform any one of the foregoing methods for processing an access request. The computer program product may be a software package. When any one of the foregoing data providing methods needs to be used, the computer program product may be downloaded and executed on a computer.

In addition, it needs to be noted that the apparatus embodiment described above is merely an example. The units described as separate parts may or may not be physically separate, and parts displayed as units may or may not be physical units, may be located in one position, or may be distributed on a plurality of network units. Some or all of the modules may be selected based on actual requirements to achieve the objectives of the solutions of embodiments. In addition, in the accompanying drawings of the apparatus embodiments provided in this disclosure, a connection relationship between modules means that the modules are in communication connection with each other, and may be implemented as one or more communication buses or signal cables.

Based on the description of the foregoing implementations, a person skilled in the art may clearly understand that this disclosure may be implemented through software and necessary general-purpose hardware, and certainly may also be implemented through special-purpose hardware including an ASIC, a dedicated CPU, a dedicated memory, a dedicated component, and the like. Generally, any function realized by a computer program may be easily implemented by corresponding hardware. In addition, a function may be implemented by various specific hardware structures, for example, an analog circuit, a digital circuit, or a dedicated circuit. However, in this disclosure, implementation using a software program is preferred in most cases. Based on such an understanding, the technical solutions of this disclosure essentially or the part contributing to other technologies may be embodied in a form of software product. The computer software product is stored in a readable storage medium, such as a computer floppy disk, a Universal Serial Bus (USB) flash drive, a removable hard disk, a ROM, a RAM, a magnetic disk, or an optical disc, and includes several instructions to enable a computer device (which may be a personal computer, a training device, a network device, or the like) to perform the methods described in embodiments of this disclosure.

All or a part of the foregoing embodiments may be implemented by software, hardware, firmware, or any combination thereof. When software is used to implement the embodiments, all or a part of the embodiments may be implemented in a form of a computer program product.

The computer program product includes one or more computer instructions. When the computer program instructions are loaded and executed on the computer, the procedures, or functions based on embodiments of this disclosure are all or partially generated. The computer may be a general-purpose computer, a dedicated computer, a computer network, or any other programmable apparatus. The computer instructions may be stored in a computer-readable storage medium, or may be transmitted from a computer-readable storage medium to another computer-readable storage medium. For example, the computer instructions may be transmitted from a website, a computer, a training device, or a data center to another website, computer, training device, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage apparatus, such as a server or a data center, integrating one or more usable media. The usable medium may be a magnetic medium (for example, a floppy disk, a hard disk, or a magnetic tape), an optical medium (for example, a Digital Versatile Disc (DVD)), a semiconductor medium (for example, an SSD)), or the like.

What is claimed is:

1. A method, comprising:
   obtaining, from an internal memory of a storage apparatus, a first access request in a remote direct memory access (RDMA) format, wherein the first access request requests to access a persistent storage medium of the storage apparatus and to access a volume of data that does not exceed a preset threshold, and wherein the first access request is split into access sub-requests when the volume of data exceeds the preset threshold;
   directly converting the first access request into a second access request in a non-volatile memory express (NVMe) format; and
   executing a target operation corresponding to the second access request to access the persistent storage medium.

2. The method of claim 1, wherein directly converting the first access request comprises:
   converting the first access request into the second access request; and
   writing the second access request into an NVMe submit queue.

3. The method of claim 2, wherein executing the target operation comprises:
   obtaining, from the NVMe submit queue, the second access request;
   executing the second access request to read data from the persistent storage medium; and
   storing a response message to the access request in the NVMe format into an NVMe completion queue.

4. The method of claim 3, further comprising:
   directly converting the response message in the NVMe completion queue from the NVMe format to the RDMA format; and
   transmitting, based on an RDMA protocol, the response message.

5. An apparatus, comprising:
   one or more memories configured to store instructions; and
   at least one processor coupled to the one or more memories and configured to execute the instructions to:
      obtain, from an internal memory of the apparatus, a first access request in a remote direct memory access (RDMA) format, wherein the first access request requests to access persistent storage medium of the apparatus and to access a volume of data that does not exceed a preset threshold, and wherein the first access request is split into access sub-requests when the volume of data exceeds the preset threshold;

directly convert the first access request into a second access request in a non-volatile memory express (NVMe) format; and execute a target operation corresponding to the second access request to access the persistent storage medium.

6. The apparatus of claim 5, wherein the at least one processor is further configured to execute the instructions to:

obtain, from the internal memory, the first access request;

convert the first access request into the second access request; and write the second access request into an NVMe submit queue.

7. The apparatus of claim 6, wherein the at least one processor is further configured to execute the instructions to:

obtain, from the NVMe submit queue, the second access request;

execute the second access request to read data from the persistent storage medium; and store a response message to the access request in the NVMe format into an NVMe completion queue.

8. The apparatus of claim 7, wherein the at least one processor is further configured to execute the instructions to:

directly convert the response message in the NVMe completion queue from the NVMe format to the RDMA format; and transmit, based on an RDMA protocol, the response message.

9. The apparatus of claim 6, wherein the at least one processor is further configured to execute the instructions to:

obtain, from the NVMe submit queue, the second access request;

execute the second access request to write data into the persistent storage medium; and store a response message to the access request in the NVMe format into an NVMe completion queue.

10. The apparatus of claim 5, wherein the persistent storage medium comprises a non-volatile random-access memory (NVRAM).

11. The apparatus of claim 5, wherein the persistent storage medium comprises a phase-change memory (PCM).

12. The method of claim 2, wherein executing the target operation comprises:

obtaining, from the NVMe submit queue, the second access request;

executing the second access request to write data into the persistent storage medium; and storing a response message to the access request in the NVMe format into an NVMe completion queue.

13. A computer program product comprising instructions stored on a non-transitory computer-readable medium that, when executed by a processor, cause an apparatus to:

obtain, from an internal memory of the apparatus, a first access request in a remote direct memory access (RDMA) format, wherein the apparatus comprises the internal memory and a persistent storage medium, and wherein the first access request requests to access the persistent storage medium and to access a volume of data that does not exceed a preset threshold, and wherein the first access request is split into access sub-requests when the volume of data exceeds the preset threshold;

directly convert the first access request into a second access request in a non-volatile memory express (NVMe) format; and execute a target operation corresponding to the second access request to access the persistent storage medium.

14. The computer program product of claim 13, wherein the processor is further configured to execute the instructions to:

obtain, from the internal memory, the first access request;

convert the first access request into the second access request; and write the second access request into an NVMe submit queue.

15. The computer program product of claim 14, wherein the processor is further configured to execute the instructions to:

obtain, from the NVMe submit queue, the second access request;

execute the second access request to read data from the persistent storage medium; and store a response message to the access request in the NVMe format into an NVMe completion queue.

16. The computer program product of claim 15, wherein the processor is further configured to execute the instructions to:

directly convert the response message in the NVMe completion queue from the NVMe format to the RDMA format; and transmit, based on an RDMA protocol, the response message.

17. The computer program product of claim 14, wherein the processor is further configured to execute the instructions to:

obtain, from the NVMe submit queue, the second access request;

execute the second access request to write data into the persistent storage medium; and store a response message to the access request in the NVMe format into an NVMe completion queue.

18. The computer program product of claim 13, wherein each of the access sub-requests corresponding to the volume of the data is less than or equal to the preset threshold.

19. The method of claim 1, wherein each of the access sub-requests corresponding to the volume of the data is less than or equal to the preset threshold.

20. The apparatus of claim 5, wherein each of the access sub-requests corresponding to the volume of the data is less than or equal to the preset threshold.

* * * * *